United States Patent [19]

Nakamura et al.

[11] 4,439,713
[45] Mar. 27, 1984

[54] DEFLECTION CONTROL CIRCUIT FOR IMAGE PICK-UP TUBE

[75] Inventors: Takashi Nakamura, Hadano; Yoshihiro Morioka, Atsugi, both of Japan

[73] Assignee: Sony Corporation, Tokyo, Japan

[21] Appl. No.: 282,028

[22] Filed: Jul. 10, 1981

[30] Foreign Application Priority Data

Jul. 11, 1980 [JP] Japan ................................ 55-95476

[51] Int. Cl.³ ............................................ H01J 29/56
[52] U.S. Cl. ..................................... 315/370; 358/217
[58] Field of Search ............... 315/370, 396, 397, 408; 358/217, 50, 41, 223, 51

[56] References Cited

U.S. PATENT DOCUMENTS

| 4,199,785 | 4/1980 | McCullough et al. | 358/183 |
| 4,224,556 | 9/1980 | Muto | 315/396 |
| 4,355,336 | 10/1982 | Hirschfeld et al. | 358/217 |

*Primary Examiner*—Theodore M. Blum
*Attorney, Agent, or Firm*—Lewis H. Eslinger; Alvin Sinderbrand

[57] ABSTRACT

A circuit for controlling the deflection of an electron beam in an image pick-up tube of the electro-static deflection type including a target electrode, a cathode electrode for generating the electron beam, and deflection plates for causing the electron beam to scan the target electrode, the circuit including a current source transistor for generating a current, a first capacitor for storing a voltage corresponding to the generated current, a pair of switching transistors for generating a saw-tooth signal in accordance with the voltage stored by the capacitor and for supplying the saw-tooth signal to the deflection plates for causing the beam to scan an effective image area on the target electrode, a transistor for increasing the amount of current generated by the current source transistor when the effective image area is not being scanned, a circuit for discharging the capacitor during only a portion of the time period when the effective image area is not being scanned and for clamping the level of the saw-tooth signal to an over-scan start potential, and a circuit for clamping the level of the signal to an effective scan start potential when the electron beam begins scanning the effective image area, wherein the electron beam is caused to scan an over-scan area outside the effective image area at a rate faster than used to scan the effective image area so as to neutralize charges in the over-scan area which tend to distort the electron beam.

16 Claims, 5 Drawing Figures

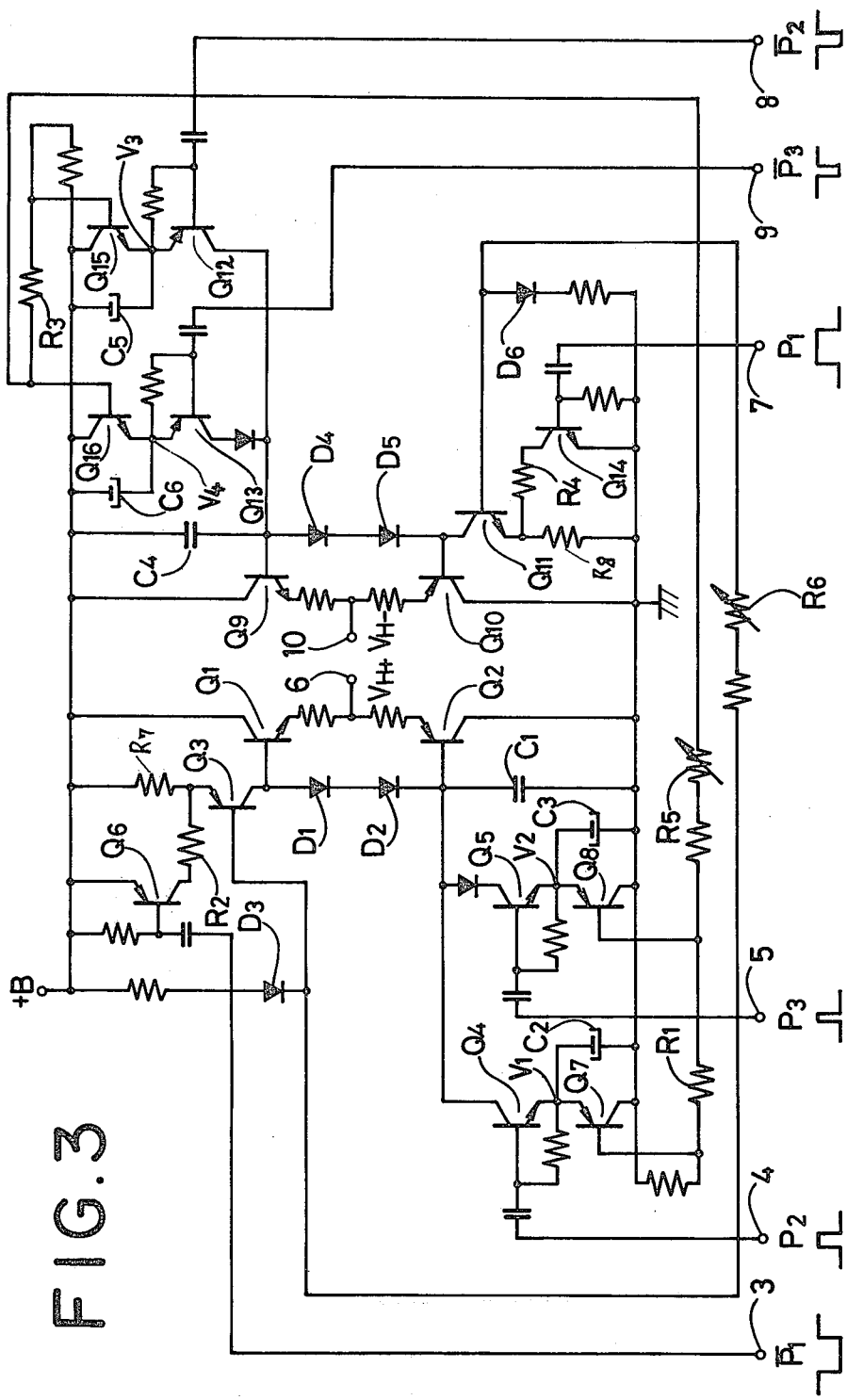
F I G. 3

DEFLECTION CONTROL CIRCUIT FOR IMAGE PICK-UP TUBE

BACKGROUND OF THE INVENTION

1. Field of the Invention

This invention relates generally to an image pick-up tube and, more particularly, is directed to an apparatus for controlling the deflection of an electron beam in an image pick-up tube of the electro-static deflection type.

2. Description of the Prior Art

Generally, in a photoconduction-type image pick-up tube, a cathode electrode emits an electron beam which is directed towards a target electrode having a photo-conversion layer deposited thereon. The image pick-up tube further includes horizontal and vertical deflection plates which, when supplied with appropriate signals, cause the electron beam from the cathode electrode to scan the target electrode. As the electrons from the beam impinge upon the target electrode, some are absorbed thereby to neutralize positive charges that reside there due to incident light from an object image projected on the target electrode. The varying amounts of electron-absorbtion produce an output current of corresponding intensity from which a video output signal is produced.

Generally, although incident light from the object image may be projected on the entire target electrode, the electron beam only scans an effective image area thereon. However, when the area outside of the effective image area on the target electrode is electrically charged due to incident light from the object image, the electron beam does not discharge or neutralize such charges. These unneutralized charges tend to bend or distort the electron beam. Accordingly, the edges of the reproduced picture become distorted.

OBJECTS AND SUMMARY OF THE INVENTION

Accordingly, it is an object of this invention to provide an apparatus for controlling the deflection of an electron beam in an image pick-up tube that avoids the above-described difficulties encountered with the prior art.

More particularly, it is an object of this invention to provide an apparatus for controlling the deflection of an electron beam in an image pick-up tube which results in electric charges in the area outside of the effective image area on the target electrode being effectively discharged or neutralized.

It is another object of this invention to provide an apparatus for controlling the deflection of an electron beam in an image pick-up tube which results in no distortion at the periphery or fringe area of the reproduced picture.

In accordance with an aspect of this invention, apparatus for controlling the deflection of an electron beam in an image pick-up tube of the type including target means, means for generating the electron beam, and deflection means for causing the generated electron beam to scan the target means, comprises means for generating a saw-tooth signal and for supplying the signal to the deflection means for causing the electron beam to scan an effective image area on the target means; and means for modifying the signal supplied to the deflection means for causing the electron beam to scan an over-scan area on the target means outside of the effective image area.

The above, and other, objects, features and advantages of the invention will be apparent in the following detailed description of an illustrative embodiment of the invention which is to be read in connection with the accompanying drawings.

BRIEF DESCRIPTION OF THE DRAWINGS

FIG. 3 is a circuit wiring diagram of a horizontal deflection control circuit according to one embodiment of this invention;

DETAILED DESCRIPTION OF A PREFERRED EMBODIMENT

Figure 1:
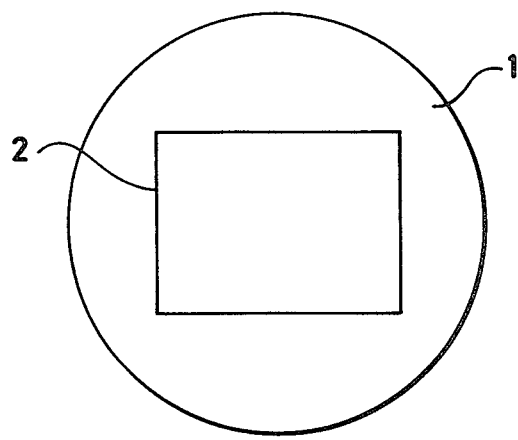
FIG. 1 is a schematic plan view of a target electrode of a known image pick-up tube, illustrating the effective image area scanned thereon.

Referring to the drawings in detail, and initially to FIG. 1 thereof, there is shown a schematic front view of a target electrode 1 of a known image pick-up tube, illustrating the effective image area 2 scanned by the electron beam thereon. As previously discussed, when incident light from an object image is projected on target electrode 1, charges are produced on the target electrode. Because the electron beam is caused to scan only the effective image area 2, charges in the area outside of effective image area 2 are not discharged or neutralized. These unneutralized charges cause the electron beam to bend, resulting in distortion of the reproduced picture at the periphery thereof.

Figure 2:
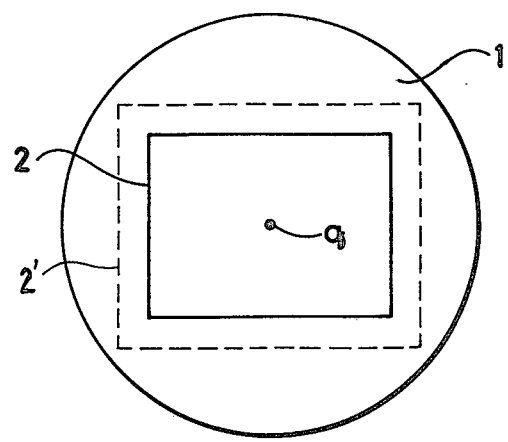
FIG. 2 is a schematic plan view of a target electrode of an image pick-up tube with which the present invention can be utilized, illustrating the over-scan operation according to the present invention.

In accordance with an aspect of the present invention, the electron beam is caused to over-scan the effective image area 2 in both the vertical and horizontal directions, as shown by the dotted line 2' in FIG. 2. As a result, charges in the over-scan area 2' outside of effective image area 2 are effectively discharged or neutralized so as to prevent the aforementioned distortion.

Figure 5:
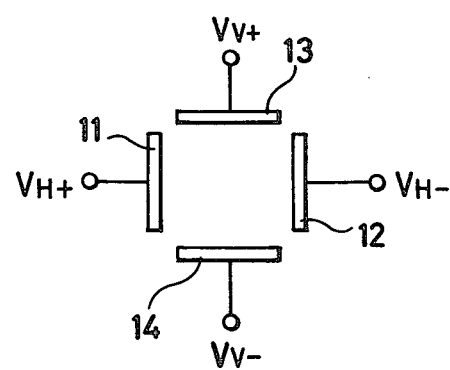
FIG. 5 is a schematic side view of the horizontal and vertical deflection plates with which the present invention are utilized.

Referring now to FIG. 3, there is shown a horizontal deflection control circuit according to one embodiment of this invention for use in an image pick-up tube of the electro-static deflection type and which produces horizontal deflection voltages $V_{H+}$ and $V_{H-}$ which are supplied to horizontal deflection plates 11 and 12 (FIG. 5), respectively, to cause the electron beam to scan both effective image area 2 and over-scan area 2'. That portion of the circuit of FIG. 3 which produces the horizontal deflection voltage $V_{H+}$ will first be discussed. In particular, an NPN switching transistor $Q_1$ and a PNP switching transistor $Q_2$ have their collector-emitter paths connected in series between a power source $+B$ and a reference potential. The connection point therebetween constitutes an output terminal 6 from which the horizontal deflection voltage $V_{H+}$ is obtained. A capacitor $C_1$ is connected between the reference potential and the base of transistor $Q_2$ and is adapted to be charged by current supplied from a current source transistor $Q_3$ through two series-connected diodes $D_1$ and $D_2$, the latter diodes being provided for temperature compensation. As shown in FIG. 3, current source transistor $Q_3$ is a PNP transistor having its emitter-collector path connected between the power source $+B$ (through an emitter resistor 7) and the anode of diode $D_1$, and having its collector connected to the base of transistor $Q_1$. It should be appreciated that the horizontal deflection voltage $V_{H+}$ which controls the scanning of the electron beam in the effective image area 2 and the over-scan area 2' is controlled in accordance with the charging voltage of capacitor $C_1$.

In addition, a PNP over-scan transistor $Q_6$ has its emitter connected to power source $+B$ and its collector connected to the emitter of current source transistor $Q_3$ through a resistor $R_2$. In other words, the series connection of the emitter-collector path of transistor $Q_6$ and resistor $R_2$ is connected in parallel with the emitter resistor of current source transistor $Q_3$. The base of transistor $Q_6$ is connected to power source $+B$ through a resistor and to an input terminal 3 through a capacitor. During the conventional video blanking period, that is, during the time when the electron beam is not scanning the effective image area, a video blanking pulse $P_1$ is produced, as shown in FIG. 4A. The inverse $\overline{P}_1$ of this pulse is supplied to the base of transistor $Q_6$ from input terminal 3, so as to turn transistor $Q_6$ ON. This results in a change in the emitter resistance of transistor $Q_3$ which, in turn, results in an increase in the flow of current from current source transistor $Q_3$ to capacitor $C_1$. Also, a diode $D_3$ is connected between power source $+B$ and the base of transistor $Q_3$ for temperature compensation.

The circuit of FIG. 3 also includes a discharge circuit for discharging capacitor $C_1$ and which also functions to clamp the horizontal voltage $V_{H+}$ to an over-scan start potential $V_1$. In particular, the discharge circuit includes an NPN transistor $Q_4$ having its collector connected to the connection point of capacitor $C_1$ with the base of transistor $Q_2$, and its base connected through a capacitor to an input terminal 4. The base of transistor $Q_4$ is also connected to the emitter thereof through a resistor. The emitter of transistor $Q_4$ is connected to the aforementioned reference potential through a capacitor $C_2$ and through the emitter-collector path of PNP transistor $Q_7$ which, among other purposes as will hereinafter be described, is used for temperature compensation. The collector of transistor $Q_7$ is connected through a resistor to the base thereof.

During a central portion of the conventional video blanking period, the base of discharge transistor $Q_4$ is supplied with a beam blanking pulse $P_2$ during a flyback time period $T_2$, as shown in FIG. 4B. When pulse $P_2$ is supplied to the base of discharge transistor $Q_4$, this latter transistor is turned ON. As a result, capacitor $C_1$ discharges through the collector-emitter path thereof to charge capacitor $C_2$. It is to be appreciated that capacitor $C_2$ maintains a first voltage corresponding to an over-scan start potential $V_1$ for the horizontal deflection voltage $V_{H+}$. When the voltage stored by capacitor $C_2$ increases to a voltage greater than the aforementioned first voltage, transistor $Q_7$ turns ON so that capacitor $C_2$ discharges through the emitter-collector path thereof. When the voltage stored by capacitor $C_2$ is less than the first voltage, transistor $Q_7$ is turned OFF and capacitor $C_2$ charges up to the first voltage. Thus, the discharging of capacitor $C_1$ is inhibited when an equilibrium condition results between capacitor $C_1$ and capacitor $C_2$, that is, when the voltage stored by capacitor $C_1$ is substantially equal to the over-scan start potential $V_1$.

This equilibrium condition results in the horizontal deflection voltage $V_{H+}$ being maintained at the over-scan start potential $V_1$. When pulse $P_2$ is removed, the discharge path for capacitor $C_1$ is disconnected and this latter capacitor again begins to charge at an increased rate, since transistor $Q_6$ is still turned ON.

The control circuit of FIG. 3 also includes a second clamp circuit comprised of an NPN clamping transistor $Q_5$ having its collector connected to the cathode of a diode, the anode of which is connected to the connection point of capacitor $C_1$ with the base of transistor $Q_2$, and having its base connected to an input terminal 5 through a capacitor. The emitter of transistor $Q_5$ is connected to the aforementioned reference potential through a capacitor $C_3$ and through the emitter-collector path of a PNP transistor $Q_8$ which, among other purposes as will hereinafter be described, is used for temperature compensation. The emitter of transistor $Q_5$ is also connected to its base through a resistor, and the collector of transistor $Q_8$ is connected through a resistive path to its base. Transistor $Q_5$ is turned ON by a pulse $P_3$, shown in FIG. 4C, supplied to its base when the horizontal deflection voltage $V_{H+}$ has risen from its over-scan start potential $V_1$ to an effective scan start potential $V_2$. The second clamp circuit operates to clamp, or maintain the horizontal deflection voltage $V_{H+}$ to the effective scan start potential $V_2$. When the voltage stored by capacitor $C_3$ is greater than a second voltage corresponding to the effective scan start potential $V_2$, transistor $Q_8$ turns ON to discharge capacitor $C_3$ through the emitter-collector path thereof. When the voltage stored by capacitor $C_3$ is less than the second voltage, transistor $Q_8$ is turned OFF and capacitor $C_3$ charges up to the second voltage. In this manner, the voltage to which capacitor $C_1$ is charged is maintained constant and accordingly, the horizontal deflection voltage $V_{H+}$ is maintained at the effective scan start potential $V_2$.

Figure 4:
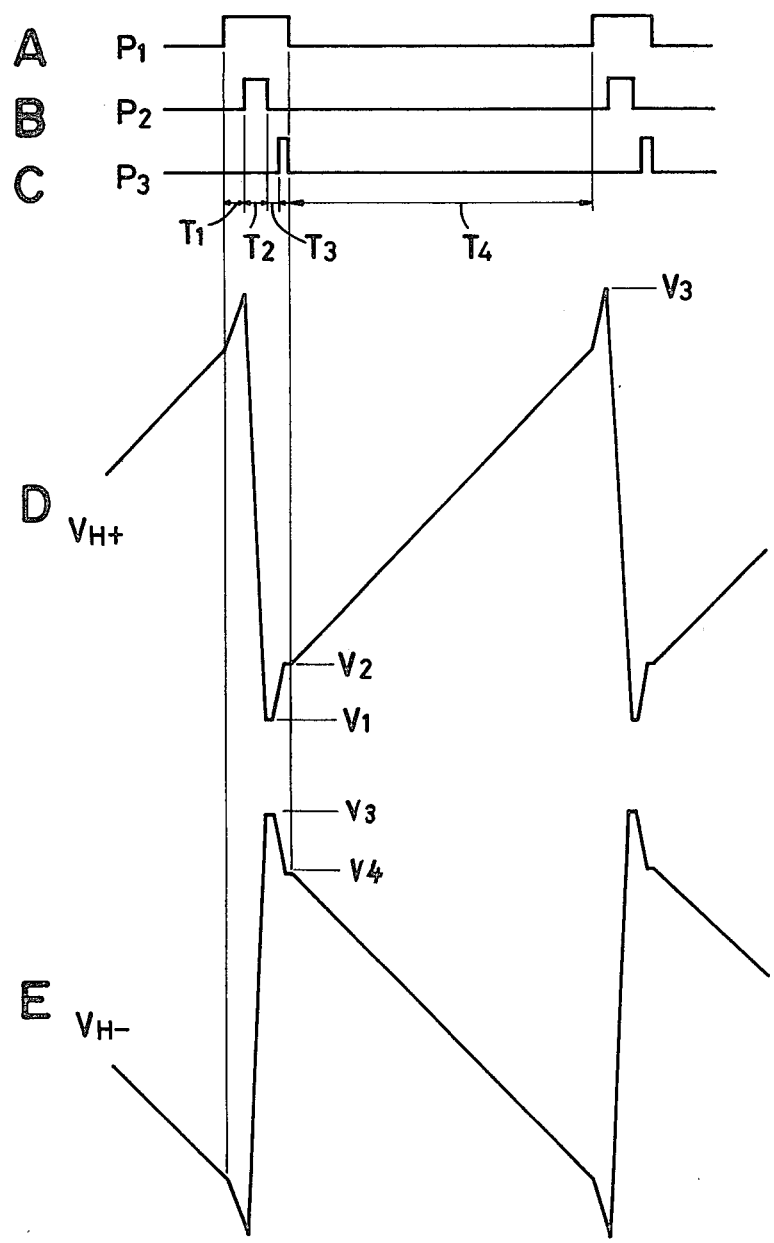
FIG. 4 is a waveform diagram used for explaining the operation of the circuit of FIG. 3.

The operation of the circuit of FIG. 3 will now be described with reference to the waveform diagrams of FIG. 4. In operation, during time period $T_4$, capacitor $C_1$ is charged at its normal rate by the current supplied from current source transistor $Q_3$. When the electron beam reaches the end of the effective image area 2, at the end of time period $T_4$, inverted pulse $\overline{P}_1$ is supplied to the base of transistor $Q_6$ from input terminal 3. This results in an increase in the flow of current from current source transistor $Q_3$, whereby capacitor $C_1$ charges at faster rate. This, of course, results in the horizontal deflection voltage $V_{H+}$ also rising at the faster rate, as shown in FIG. 4D, thereby causing the electron beam to over-scan the effective image area 2 at a faster rate, that is, to scan the portion of over-scan 2' to the right of the effective image area 2 of FIG. 2 at a rate which is faster than that by which image area 2 is scanned. This increased scan rate continues during an over-scan time period $T_1$ (in the conventional video blanking period). At the end of time period $T_1$, the horizontal deflection voltage has reached a peak potential $V_3$ and has caused the electron beam to complete the scanning of the over-scan area 2' at the faster rate. Thus, at the end of the time period $T_1$, beam blanking pulse $P_2$ is supplied to the base of transistor $Q_4$ which, in response thereto, turns ON to provide a discharge path for capacitor $C_1$ through the collector-emitter path thereof. Capacitor $C_1$ discharges until an equilibrium condition is achieved with capacitor $C_2$, which equilibrium condition corresponds to a horizontal deflection voltage $V_{H+}$ equal to the over-scan start potential $V_1$. This latter potential is maintained until the end of time period $T_2$, that is, when pulse $P_2$ is no longer applied. At such time, the discharge path for capacitor $C_1$ is disconnected and this latter capacitor again begins to charge at an increased rate during over-scan time period $T_3$. This results in the horizontal deflection voltage $V_{H+}$ also rising at such increased rate, thereby causing the electron beam to scan from the beginning of the over-scan area 2' to the beginning of effective image area 2 at a faster rate during time period $T_3$.

At the end of over-scan time period $T_3$, pulse $P_3$ is supplied to the base of transistor $Q_5$ to turn this transistor ON. Thus, the voltage across capacitor $C_1$ is maintained substantially constant and the horizontal deflection voltage $V_{H+}$ is maintained at the effective scan start potential $V_2$. At the end of the contional video blanking period, the inverted pulse $\overline{P}_1$ is removed from the base of transistor $Q_6$, and pulse $P_3$ is removed from the base of transistor $Q_5$, whereby capacitor $C_1$ again begins to charge at its normal rate during the time period $T_4$. This means that the electron beam scans the effective image area 2 during such period at its normal rate.

It should be appreciated that the clamping of the horizontal deflection voltage $V_{H+}$ to the effective scan start potential $V_2$ is necessary in view of the possible variation of over-scan start potential $V_1$. Thus, if the effective scan start potential $V_2$ is not clamped or set, the level of the DC voltage for the period $T_4$ will vary with changes in the over-scan start potential $V_1$. Such variation will result in the scanning center q of the effective image area 2 on the target electrode 1 being varied in the horizontal direction. In other words, the effective scan start potential $V_2$ is set for the beginning of the scanning operation of the effective image area 2 in order to prevent any centering error during the scanning operation. It is to be noted that the potential difference between over-scan start potential $V_1$ and effective scan start potential $V_2$ can be adjusted by changing the resistance of a resistor $R_1$ connected between the bases of transistors $Q_7$ and $Q_8$.

Accordingly, with the above arrangement, the electron beam is caused to over-scan the effective image area 2 during over-scan time periods $T_1$ and $T_3$. In this manner, charges in the over-scan area 2' outside the effective image area 2 are discharged or neutralized so as to prevent the aforementioned beam scanning distortion. Further, because a portion of the conventional video blanking period is now used for the over-scan operation, the electron beam is caused to scan the over-scan area 2' and to perform its fly-back operation in a shorter time than is conventionally used. For example, the scanning times for the time periods $T_1$, $T_3$ and $T_4$ can be 3 $\mu$sec., 2 $\mu$sec. and 53 $\mu$sec., respectively and the time for the fly-back period $T_2$ can be 4 $\mu$sec., where the time for the conventional video blanking period is 10 $\mu$sec.

Although only that portion of the circuit of FIG. 3 for producing the horizontal deflection voltage $V_{H+}$ has been described herein, it should be appreciated that the control circuit of FIG. 3 includes complimentary circuitry for producing the horizontal deflection voltage $V_{H-}$, as shown in FIG. 4E, at an output terminal 10. In particular, transistors $Q_9$-$Q_{16}$ correspond to transistors $Q_1$-$Q_8$, diodes $D_4$-$D_6$ correspond to diodes $D_1$-$D_3$, capacitors $C_4$-$C_6$ correspond to capacitors $C_1$-$C_3$, resistors $R_3$, $R_4$ and $R_8$ correspond to resistors $R_1$, $R_2$ and $R_7$, and input terminals 7-9 correspond to input terminals 1-3, respectively. It should therefore be appreciated that the pulses supplied to the corresponding transistors $Q_{14}$, $Q_{12}$ and $Q_{13}$ at input terminals 7-9, respetively, are inverse to the pulses supplied at input terminals 3-5, respectively.

In addition, the control circuit of FIG. 3 includes a variable resistor $R_5$ connected between resistors $R_1$ and $R_3$ for providing a picture center adjustment operation. In particular, currents flowing through transistors $Q_7$, $Q_8$, $Q_{15}$ and $Q_{16}$ are adjusted with variable resistor $R_5$ to move the scanning center q of the effective image area 2 in the horizontal direction. A variable resistor $R_6$ is connected between the bases of transistors $Q_3$ and $Q_{11}$ to adjust the emitter voltages of these transistors whereby the size or width of the effective image area 2 in the horizontal direction can be adjusted.

It should be appreciated, that although only the horizontal deflection control circuit according to this invention has been shown and described in regard to FIG. 3, a corresponding vertical deflection control circuit is also included within the scope of the present invention and operates in a substantially identical manner to the horizontal deflection control circuit of FIG. 3. Thus, the vertical deflection control circuit produces vertical deflection voltages $V_{V+}$ and $V_{V-}$ which are supplied to vertical deflection plates 13 and 14 (FIG. 5), respectively, and have waveforms which are similar to those of the horizontal deflection voltages $V_{H+}$ and $V_{H-}$ of FIG. 4. It should be noted, however, that the scanning period $T_4$ for the vertical deflection voltages is approximately 17 to 18 times as long as the period $T_4$ for the horizontal deflection voltages. The time periods $T_1$, $T_2$ and $T_3$ for the vertical deflection voltages are also increased by this same amount in comparison with the same time periods for the horizontal deflection voltages. Also, the scanning center of the effective image area 2 can be moved in the vertical direction for providing a picture center adjustment operation and the size or height of the effective image area 2 in the vertical direction can also be changed.

It is to be noted that the present invention has particular applicability to image pick-up tubes of the electrostatic deflection type. It is difficult, however, to employ the over-scan method of this invention to an image pick-up tube of the electro-magnetic deflection type.

Having described a specific preferred embodiment of the invention with reference to the accompanying drawings, it is to be understood that the invention is not limited to that precise embodiment and that various changes and modifications may be effected therein by one skilled in the art without departing from the scope or spirit of the invention as defined in the appended claims.

What is claimed is:

1. Apparatus for controlling the deflection of an electron beam in an image pick-up tube of the type including target means, means for generating the electron beam, and deflection means for causing the generated electron beam to scan said target means, said apparatus comprising:

means for generating a saw-tooth signal and for supplying said saw-tooth signal to said deflection means for causing said electron beam to scan a raster image area on said target means; and means for neutralizing charges in an over-scan area on said target means outside of said raster image area scanned by said electron beam for each scan of said raster image area to prevent distortion of a reproduced picture resulting from scanning of a fringe area of said raster image area by said electron beam by modifying said saw-tooth signal supplied to said deflection means so as to cause said electron beam to scan said over-scan area on said target means outside of said raster image area for each scan of said raster image area.

2. Apparatus according to claim 1; in which said means for generating includes current source means for generating a current, capacitance means for storing a voltage corresponding to said generated current, and switching means for generating said saw-tooth signal in accordance with said voltage stored by said capacitance means.

3. Apparatus according to claim 2; in which the rate at which said electron beam is caused to scan said target means depends on the amount of current generated by said current source means for charging said capacitance means.

4. Apparatus according to claim 3; in which said means for neutralizing includes means for increasing the amount of current generated by said current source means when said electron beam is not scanning said raster image area, wherein the rate at which the electron beam scans said over-scan area is greater than the rate at which the electron beam scans said raster image area.

5. Apparatus according to claim 4; in which said means for generating includes resistive means, said current source means includes transistor means having an output path connected between said capacitance means and a power source, the output path being connected to said power source through said resistive means and said means for increasing includes semiconductor means for varying the resistance of said resistive means to increase the amount of current generated by said current source means.

6. Apparatus according to claim 5; in which said transistor means includes a transistor transitor for generating said current and having an emitter and a collector; said semiconductor means includes a second transistor having an emitter connected to said power source, and a collector; and said resistive means includes a first resistive element connected between the emitter of said first transistor and said power source and a second resistive element connected between the collector of said second transistor and the emitter of said first transistor, wherein the amount of current generated by said first transistor is increased when said second transistor is rendered operative.

7. Apparatus according to claim 2; in which said means for neutralizing includes discharge means for discharging said capacitance means during only a portion of the time period when said electron beam is not scanning said raster image area, so as to determine the boundaries of the scanning operation by said electron beam on said over-scan area.

8. Apparatus according to claim 7; in which said discharge means includes first semiconductor means which is rendered operative during only a portion of the time period when said electron beam is not scanning said raster image area, and clamping means for clamping the voltage stored by said capacitance means to a first value when said first semiconductor means is rendered operated so as to clamp the level of said saw-tooth signal to an over-scan start level when the electron beam begins scanning the over-scan area.

9. Apparatus according to claim 8; in which said clamping means includes second capacitance means, and second semiconductor means for maintaining the voltage stored by said second capacitance means at a second value corresponding to said first value.

10. Apparatus according to claim 9; in which said first semiconductor means includes a first transistor having a collector-emitter path connected in series with said second capacitance means, with the series connection being connected in parallel with said first-mentioned capacitance means, and said second semiconductor means includes a second transistor having a collector-emitter path connected in parallel with said second capacitance means.

11. Apparatus according to claim 2; further including clamping means for clamping the level of said saw-tooth signal to an effective scan start level when the electron beam begins scanning the raster image area.

12. Apparatus according to claim 11; in which said clamping means includes first semiconductor means which is rendered operative in a time period immediately preceding the scanning of the raster image area by the electron beam, and a clamping circuit for clamping the voltage stored by said capacitance means to a first value in said time period so as to clamp the level of said saw-tooth signal to said effective scan start level when the electron beam begins scanning the raster image area.

13. Apparatus according to claim 12; in which said clamping circuit includes second capacitance means, and second semiconductor means for maintaining the voltage stored by said second capacitance means at a second value corresponding to said first value.

14. Apparatus according to claim 13; in which said first semiconductor means includes a first transistor having a collector-emitter path connected in series with said second capacitance means, with the series connection being connected in parallel with said first-mentioned capacitance means, and said second semiconductor means includes a second transistor having a collector-emitter path connected in parallel with said second capacitance means.

15. Apparatus according to claim 2; in which said switching means includes first and second transistors, each having a collector-emitter path and a base, the collector-emitter paths of said first and second transistors being connected in series between a power source and a reference potential, the saw-tooth signal being obtained at the connection point of said collector-emitter paths, the base of said first transistor being connected to said current source means, and the base of said second transistor being connected to said capacitance means.

16. Apparatus according to claim 15; in which said means for generating further includes temperature compensation means connected between the bases of said first and second transistors.

* * * * *